US007627691B1

(12) United States Patent
Buchsbaum et al.

(10) Patent No.: US 7,627,691 B1
(45) **Date of Patent: *Dec. 1, 2009**

(54) METHOD FOR FAST NETWORK-AWARE CLUSTERING

(75) Inventors: Adam Louis Buchsbaum, Madison, NJ (US); Glenn Stephen Fowler, Scotch Plains, NJ (US); Balachander Krishnamurthy, New York, NY (US); Jia Wang, Summit, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/732,279

(22) Filed: Apr. 3, 2007

Related U.S. Application Data

(63) Continuation of application No. 09/705,675, filed on Nov. 3, 2000, now Pat. No. 7,219,160, and a continuation-in-part of application No. 09/603,154, filed on Jun. 23, 2000, now Pat. No. 6,928,485.

(60) Provisional application No. 60/234,511, filed on Sep. 22, 2000, provisional application No. 60/215,302, filed on Jun. 30, 2000, provisional application No. 60/151,194, filed on Aug. 27, 1999.

(51) Int. Cl.
*G06F 15/173* (2006.01)

(52) U.S. Cl. .................. 709/242; 370/395.31; 370/255; 370/392; 709/220; 707/104.1

(58) Field of Classification Search ................. 709/242, 709/202, 220; 370/392, 254, 401, 395.31, 370/255; 707/2, 3, 8, 104.1
See application file for complete search history.

(56) References Cited

U.S. PATENT DOCUMENTS

| | | | | |
|---|---|---|---|---|
| 6,052,683 | A * | 4/2000 | Irwin | 707/8 |
| 6,061,712 | A * | 5/2000 | Tzeng | 709/202 |
| 6,223,172 | B1 * | 4/2001 | Hunter et al. | 707/3 |
| 6,412,008 | B1 | 6/2002 | Fields et al. | |
| 6,418,544 | B1 | 7/2002 | Nesbitt et al. | |
| 6,522,632 | B1 * | 2/2003 | Waters et al. | 370/254 |
| 6,529,508 | B1 * | 3/2003 | Li et al. | 370/392 |
| 6,570,866 | B1 * | 5/2003 | Murase et al. | 370/351 |
| 6,611,873 | B1 | 8/2003 | Kanehara | |
| 6,628,652 | B1 | 9/2003 | Chrin et al. | |
| 6,928,485 | B1 * | 8/2005 | Krishnamurthy et al. | 709/242 |
| 6,965,943 | B1 | 11/2005 | Golestani | |
| 6,970,924 | B1 | 11/2005 | Chu et al. | |
| 6,993,034 | B1 * | 1/2006 | Block et al. | 370/401 |
| 7,191,168 | B1 * | 3/2007 | Buchsbaum et al. | 707/2 |
| 7,219,160 | B1 * | 5/2007 | Buchsbaum et al. | 709/242 |

* cited by examiner

*Primary Examiner*—Jungwon Chang

(57) ABSTRACT

A method for clustering together network IP addresses is disclosed. A number of IP addresses are received and processed to determine which IP addresses share a longest prefix matching. The longest prefix matching process is performed according to radix encoded trie which facilitates on-line clustering of the IP addresses. Client and/or server IP addresses may be clustered in accordance with the teachings herein.

20 Claims, 6 Drawing Sheets

160

| ROUTES | | AS PATH |
|---|---|---|
| 134.87.2.0/24 | BCnet | 6509 271 |
| 134.117.0.0 | CARLETON UNIVERSITY | 6509 10786 |
| 137.82.0.0 | UNIVERSITY OF BRITISH COLUMBIA | 6509 271 |
| 137.122.0.0 | UNIVERSITY OF OTTAWA | 6509 10786 |

170 180 190

10
30
36
32
34
C1
C2
Cn
20
50
58
52
54
56
CA1
CA2
CA3
CAn
40
70
72
CB1
CB2
Cn
60
90

*FIG. 2*
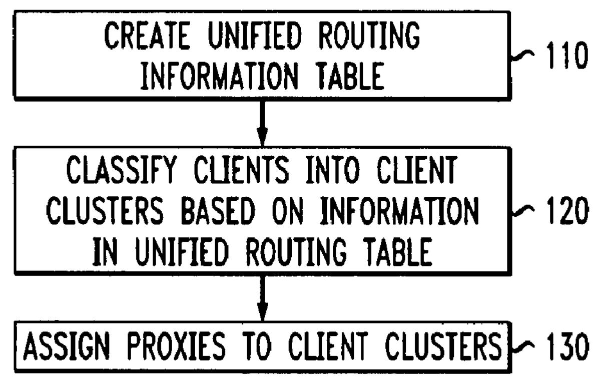
*FIG. 3*
160
| ROUTES | | AS PATH |
|---|---|---|
| 134.87.2.0/24 | BCnet | 6509 271 |
| 134.117.0.0 | CARLETON UNIVERSITY | 6509 10786 |
| 137.82.0.0 | UNIVERSITY OF BRITISH COLUMBIA | 6509 271 |
| 137.122.0.0 | UNIVERSITY OF OTTAWA | 6509 10786 |
170 180 190
*FIG. 4*
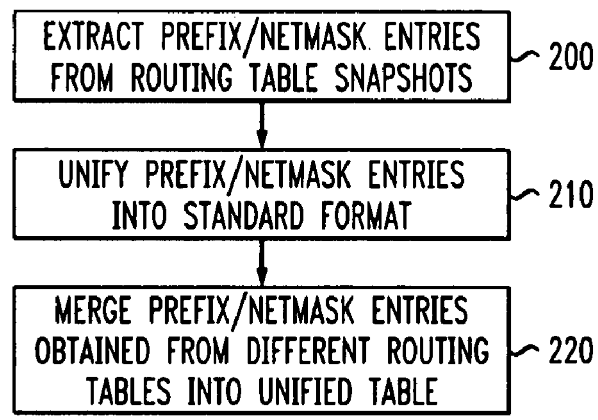

*FIG. 5*
| | 230 | 240 | 250 |
|---|---|---|---|
| FORMATS | x1.x2.x3.x4/k.1k.2k.3k.4 | x1.x2.x3.x4/1 | x1.x2.x3.0 |
| ROUTING TABLES | MAE-EAST<br>MAE-WEST<br>PACBELL<br>PAIX | ARIN<br>AT&T<br>CANET<br>NLANR<br>VBNS | CANET |
| EXAMPLES | 193.1/255.255<br>193.0.128/255.255.192 | 128.148.0.0/16 | 130.15.0.0 |
| UNIFICATION | 193.1/255.255<br>193.0.128/255.255.192 | 128.148.0.0/255.255 | 130.15.0.0/255.255<br>197.75.72/255.255.255 |
*FIG. 6*
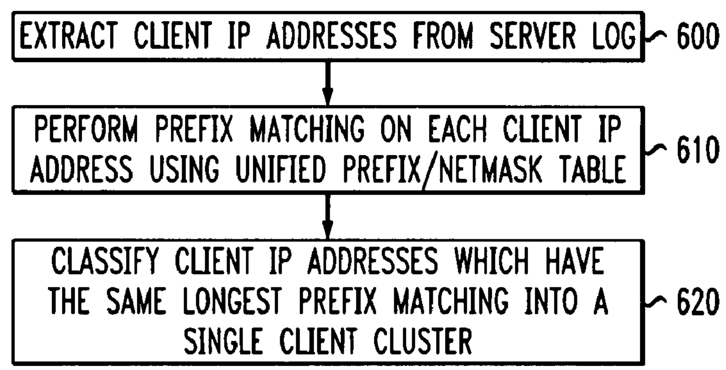
*FIG. 7*
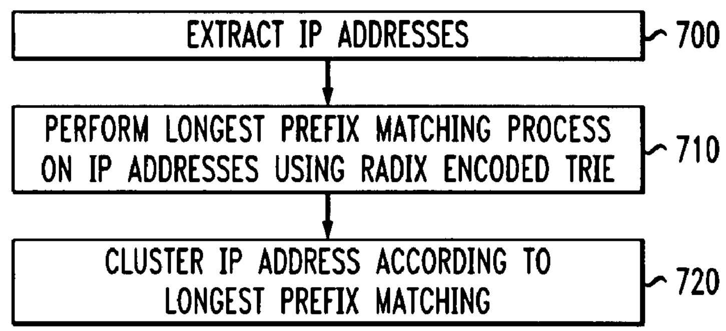

*FIG. 9a* matching code for the <S, R, H> values generated by the first part of the algorithm

```
/*
 * multi-level retrie longest prefix match
 *
 * input arguments:
 *
 *     S      top level shift
 *     R      retrie internal nodes
 *     H      retrie leaf nodes (next hop index)
 *     addr   IP address to match
 *
 * return:
 *
 *     0      no match
 *     >0     next hop index
 */

int
lpmatch (uint8 S, uint32* R, uint8* H, uint32 addr)
{
      uint32      b;
      uint32      x;

      x = R [addr >> S];
      while (b = >> 27)
      {
            b = (x & ((1<<26) -1)) + ((addr>>(S-=b)) & (1<<b) -1));
            if (x & (1<<26))
            {
                  x = H[b];
                  break;
            }
            x = R[b];
      }
      return x;
}
```

*FIG. 9b*

```
/*
 * 2-level retrie longest prefix match
 *
 * input arguments:
 *
 *     S      top level shift
 *     R      retrie internal nodes
 *     H      retrie leaf nodes (next hop index)
 *     addr   IP address to match
 *
 * return:
 *
 *     0      no match
 *     >0     next hop index
 */

int
lpmatch (uint8 S, uint32* R, uint8* H, uint32 addr)
{
      uint32        x;

      x = R [addr >> S];
      return. H[(x & ((1<<26)-1)) + ((addr & ((1<<S) -1)) >> (S - (x>>27)))];
}
```

METHOD FOR FAST NETWORK-AWARE CLUSTERING

This application is a continuation of prior U.S. patent application Ser. No. 09/705,675 filed Nov. 3, 2000, now U.S. Pat. No. 7,219,160, which claims the benefit of U.S. Provisional Patent Application No. 60/215,302 filed Jun. 30, 2000 and U.S. Provisional Patent Application No. 60/234,511 filed Sep. 22, 2000 and which is a continuation-in-part of prior U.S. patent application Ser. No. 09/603,154 filed Jun. 23, 2000, now U.S. Pat. No. 6,928,485, which claims the benefit of U.S. Provisional Patent Application No. 60/151,194 filed Aug. 27, 1999, all of which are incorporated herein by reference.

BACKGROUND OF THE INVENTION

This invention relates to a method of grouping or clustering clients, servers and/or other entities within a network to optimize and expedite the flow, transfer, redirection and/or redistribution of data and information within the network and more particularly, to a method for fast network aware or on-line clustering which uses a radix-encoded trie process to perform longest prefix matching on one or more client and/or server network IP addresses in order to properly cluster the clients and/or server into proper clusters.

Servers, such as proxy servers, cache servers, content distribution servers, mirror servers and other related servers are typically used to speed the access of data and reduce response time for network client requests in a network, such as the World Wide Web. Generally, these network clients issue requests for information, such as in the form of a Hypertext Transfer Protocol (HTTP) requests for some information, such as one or more Web pages. These requests are then handled directly or indirectly by these servers, such as proxy servers, caches servers, content distribution servers and mirror servers, to hopefully expedite the accessing and transfer of the requested information.

Generally, these servers either act as intermediaries or as transfer or redirection points for client requests in the network. For example, in operation, a proxy server receives a request for an Internet service (such as a Web page request) from a user. If the request passes filtering requirements, the proxy server looks in its local cache of previously downloaded Web pages. If the server finds the page, the page is returned to the user without needing to forward the request to, for example, a World Wide Web server on the Internet. If the page is not in the cache, the proxy server, acting as a client on behalf of the user, requests the page from the server out on the Internet. When the page is returned, the proxy server relates it to the original request and forwards it on to the client user.

Strategically designing placement of proxies in the network can benefit greatly from clustering network client users who are from the same network together so that the proxy server can adequately and efficiently serve these respective client clusters. Mis-characterizing clients as being in the same network may result in a proxy server being placed such that it impracticably and inefficiently serves these clients resulting in degraded performance in the network.

In the case of, for example, a cache or a content distribution server, the user's HTTP request at an originating server is typically re-routed away from the originating server and on to a cache server "closer" to the user. Generally, the cache server determines what content in the request exists in the cache, serves that content, and retrieves any non-cached content from the originating server. Any new content may also be cached locally in the cache server.

Similar to the strategic placement of proxies, the placement of cache servers, content distribution "boxes" or servers and related mirror servers can be best made by accurately clustering clients together in the network. Performance in the network may thus be improved by accurately and properly clustering multiple network clients together in related client clusters. The servers, whether they are cache servers, content distribution servers and/or mirror servers can then efficiently service these client clusters.

Knowledge of these network clusters, such as identifying certain "busy" clusters from which a certain level of network traffic originates can be used in a variety of different applications. For example, a busy Web site may want to provide tailored responses and/or Quality of Service differentiation based on the origin of requests to the Web site. Web sites and/or servers may also be able to dynamically perform automatic user request re-direction where needed in the network based on clustering information. However, such information needs to be captured in an efficient, expedited and real-time basis without any undue lag time which may be experienced by the Web site requester.

Accordingly, it would be desirable to have a method for accurately clustering clients, servers and other entities within a network together to guide placement of proxies, cache servers, content distribution servers and mirror servers within the network. It would also be desirable to have a method for fast on-line clustering which may be used in applications such as content distribution, proxy positioning, server replication and network management.

SUMMARY OF THE INVENTION

The present invention is a method for guiding placement of servers, such as proxy servers, cache servers, content distribution servers and mirror servers within a distributed information network. The method uses information from at least one network log, such as a server log or proxy log, and at least one network routing table to arrange clients into related client clusters. In one embodiment, the method includes the steps of generating a unified prefix/netmask table from a plurality of extracted prefix/netmask entries, extracting a plurality of client IP addresses from the at least one network log, comparing each of the plurality of client IP addresses with entries in the unified/prefix netmask table to determine a common longest prefix matching between each of the plurality of client IP addresses and the entries in the unified/prefix netmask table and grouping all of the client IP addresses which share the common longest prefix matching into at least one client cluster. Each client within a client cluster will share a common network address prefix from the unified routing table with the other clients in the same client cluster.

Preferably, a number of different routing table snapshots are used in extracting entries for the unified prefix/netmask table. These multiple entries from the different prefix/netmask tables are unified into a singular format and then merged into a single table.

Network servers, such as proxy servers, cache servers, content distribution servers and mirror servers may be assigned to one or more clusters based on a number of factors such as the number of clients within the cluster, the number of requests issued, the URLs accessed and the number of bytes fetched from a server, such as a Web server.

The present invention is also a method for on-line network-aware clustering. In one embodiment, on-line network aware clustering includes extracting client IP addresses, performing longest prefix matching on each client IP address and classifying all the client IP address that have the same longest matched prefix into a client cluster, wherein the longest prefix matching is performed in accordance with a radix-encoded trie process. In other embodiments, the on-line network aware clustering may be performed to detect server clusters, instead of client clusters, in the network. In such an embodiment, on-line network aware clustering for server clusters includes extracting server IP addresses from one or more proxy logs, performing longest prefix matching on each server IP address and classifying all the server IP addresses that have the same longest matched prefix into a server cluster, wherein the longest prefix matching is performed in accordance with a radix-encoded trie process. In accordance with the teaching of the present invention, network-aware clustering may also be used to perform server replication or other related network application.

BRIEF DESCRIPTION OF THE DRAWINGS

FIG. 2 illustrates an exemplary method in accordance with the teachings of the present invention.

FIG. 3 illustrates an exemplary routing table containing routing information.

FIG. 4 illustrates an exemplary method for creating a unified routing table in accordance with the teachings of the present invention.

FIG. 5 illustrates an exemplary table containing routing information and unified routing information.

FIG. 6 illustrates an exemplary method for clustering clients in accordance with the teachings of the present invention.

FIG. 7 illustrates an exemplary method for network aware clustering in accordance with the teachings of the present invention.

FIG. 9*a* illustrates an exemplary code implementation of a radix encoded trie in accordance with the teachings of the present invention.

FIG. 9*b* illustrates another exemplary code implementation of a radix encoded trie in accordance with the teachings of the present invention.

DETAILED DESCRIPTION OF THE INVENTION

The present invention relates to a method for clustering clients and allocating servers, such as proxy servers, cache servers, content distribution servers and mirror servers, to those client clusters in a distributed information network, such as the World Wide Web. The present invention also relates to a method for clustering clients and servers in a distributed information network to aid in engineering and shaping traffic within the network, such as may be done in, for example, a content distribution application. The present invention includes methods for both off-line and on-line or fast network aware clustering of both clients and servers within the network, on-line clustering methods preferably performed according to a radix-encoded trie or retrie as discussed in more detail later herein.

Figure 1:
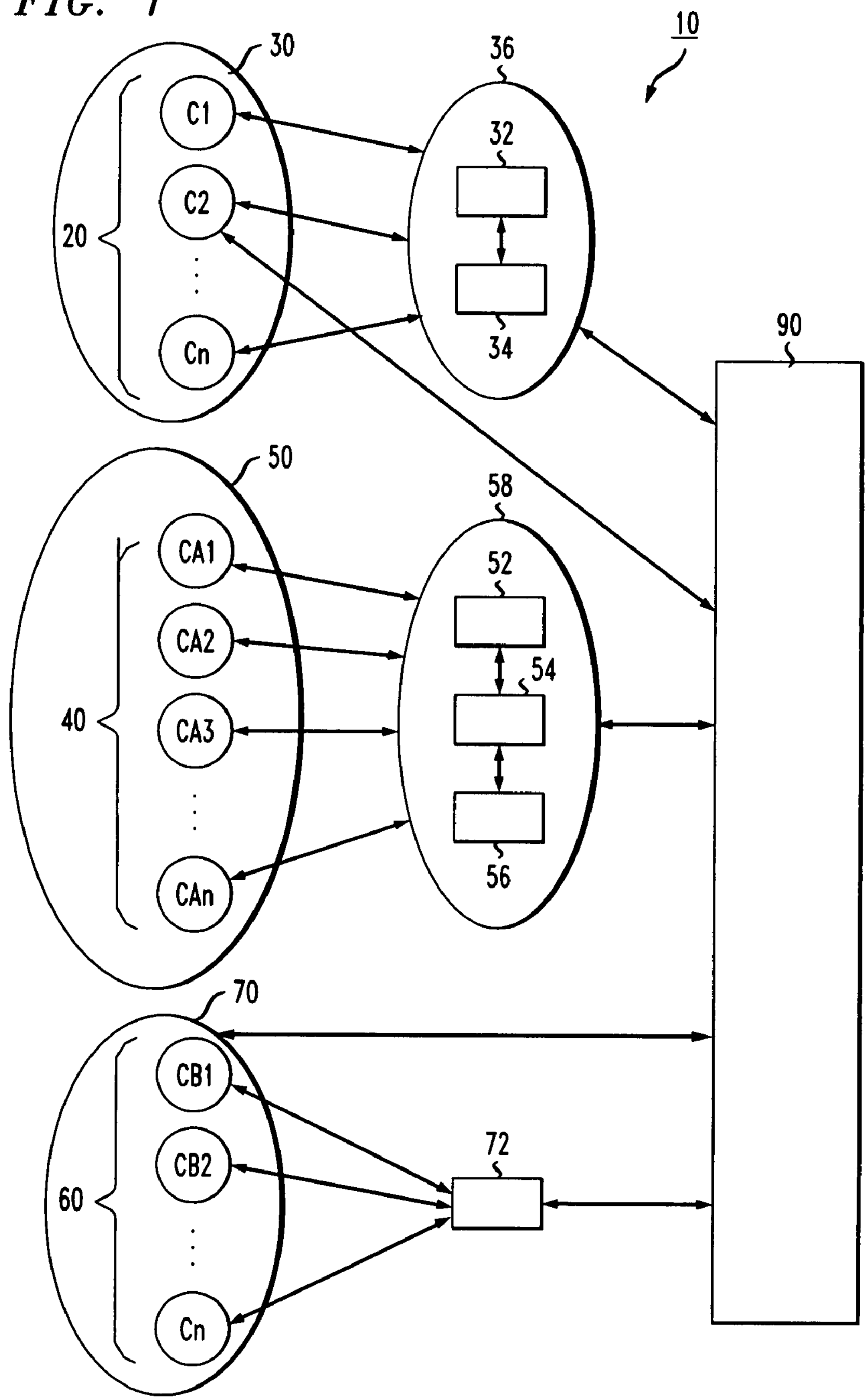
FIG. 1 illustrates an exemplary network configuration in accordance with the teachings of the present invention.

Referring to FIG. 1, an exemplary network 10 configured in accordance with the teachings of the present invention is shown. The network 10 includes a number of clients, such as clients 20 (C1, C2 . . . Cn) which are clustered together in a client cluster 30, clients 40 (CA1, CA2, CA3 . . . CAn) which are clustered together in a client cluster 50 and clients 60 (CB1, CB2 . . . CBn) which are clustered together in a client cluster 70. Client cluster 30 is in communication with servers 32, 34 which together form a server cluster 36, client cluster 50 is in communication with servers 52, 54 and 56 which form a server cluster 58 and client cluster 70 is in communication with a single server 72. In the present invention, servers 32, 34, 52, 54, 56 and 72 may be any one of proxy servers, cache servers, content distribution servers and/or mirror servers. For example, server 32 and server 34 may be proxy servers such that server cluster 36 is a proxy server cluster.

Server cluster 36 including servers 32 and 34, server cluster 58 including servers 54, 56 and 58 and server 72 are in further communication with a server, such as a World Wide Web server 90. World Wide Web server may be any server available on the Internet which is responsive to requests to and from any one of the clients and/or servers. For example, World Wide Web server may be a server which receives and responds to requests for Web pages related to one or more Web sites which are resident on the server. Other network configurations are possible provided the network servers, such as the network proxy servers, cache servers, content distribution servers and mirror servers are allocated to properly clustered client clusters as discussed in more detail later herein.

In the present invention, the placement and configuration of the servers and server clusters, such as the proxy servers and related proxy server clusters, cache servers and related cache server clusters, content distribution servers and content distribution server clusters and mirror servers and related mirror server clusters depends on the clustering of clients within the network. For example, using a content caching scheme for illustrative purposes, a client may issue a request for content, such as HTTP request to a World Wide Web server. This may be performed by the Web client clicking on a URL that is "content-delivery enabled", i.e. the URL includes the use of a special routing code that redirects the Web page request to the optimum or "closest" server. This "content-delivery enabled" URL will re-route that client's request away from the site's originating Web server and on to a cache server or cache server cluster, that is better suited to serve the client.

Referring to FIG. 2, an exemplary embodiment of a method for clustering clients and assigning or allocating servers to these client clusters is shown. In this embodiment, a unified routing information table is created, step 110. The unified routing information table, preferably includes routing information from one or more routing tables, such as network routing prefix and netmask information. For background purposes, a netmask is a series of bits designed to "mask" or conceal certain portions of an IP address. Typically, the standard netmask for a class C network like is 255.255.255.0 where the "255.255.255" prefix portion identifies the network number and the last octet, "0.0", is the actual machine number or subnetwork number. Referring again to FIG. 2, clients within the network are classified into client clusters based on information from the unified routing information table, step 120. Servers, such as proxy servers, cache servers, network distribution servers and mirror servers may then be assigned to these client clusters, step 130, as discussed in more detail later herein.

As shown in FIG. 2, the present invention utilizes routing table information from, preferably, two or more routing tables to create a unified routing information table. For background purposes, a router is a device or, in some cases, software in a computer, that determines the next network point to which a packet should be forwarded toward its destination. The router decides which way to send each information packet based on its current understanding of the state of the networks it is connected to. Typically, routers create or maintain a routing table of the available routes and their conditions and uses this information along with distance and cost algorithms to determine the best route for a given packet. An exemplary routing table or routing table "snapshot" 160 is shown in FIG. 3. As shown, the routing table or routing table snapshot 160 may include information such network prefix and netmask information 170, network identification information 180 and AS path information 190. Other additional information such as next hop IP address and AS number, etc may also be available via the network routing table. In an exemplary embodiment, as discussed above, information from a plurality of routing tables are used to create the unified routing table for use in clustering clients together.

Referring to FIG. 4, an exemplary method for creating a unified routing table is shown. To create the unified table, a number of prefix/netmask entries are extracted from a number of routing tables or routing table snapshots, step 200. Although only a single routing table or routing table snapshot may be used, preferably two or more routing tables or routing table snapshots are used since any one table is unlikely to contain the desired information on all the necessary prefix/netmask entries. Each router in a network such as the World Wide Web will typically only see a limited set of traffic, thereby it is desirable to use a multiplicity of different routing tables from different routers in order to obtain a more complete set of routing information. The prefix/netmask entries from the various tables are unified into a single standardized format, step 210, as discussed in more detail later herein. The standardized prefix/netmask entries are then merged into a single unified table, step 220, to aid in clustering together clients in the network. Typically, the unified routing table will be created periodically to incorporate possibly updated information from the routing tables in the network. The unified routing table may be created or generated at any interval such as every two hours, once a month or ten times a year as desired.

Referring to FIG. 5, a network prefix/netmask entry may be in one of three formats as shown in a tabular form. A first exemplary format 230 is configured generally as x1.x2.x3.x4/k1.k2.k3.k4 and is used in exemplary routing tables MAE-EAST, MAE-WEST, PACBELL AND PAIX, where x1.x2.x3.x4/k1.k2.k3.k4 are network prefix and netmask respectively with zeroes dropped at the end or tail. One such example is 193.1/255.255, which corresponds to 193.1.0.0/255.255.0.0, where 193.1.0.0 and 255.255.0.0 are network prefix and netmask, respectively.

Referring again to FIG. 5, another exemplary network prefix/netmask entry format 240 may also be configured as x1.x2.x3.x4/1 as in routing tables at ARIN, AT&T, CANET, NLANR AND VBNS, where x1.x2.x3.x4 is the prefix and 1 is the netmask length. For example, 128.148.0.0/16 stands for 128.148.0.0/255.255.0.0, where 128.148.0.0 and 255.255.0.0 are network prefix and netmask. Additionally, another exemplary prefix/netmask entry format may be configured as x1.x2.x3.0 which can also be found in CANET, and is an abbreviated representation of x1.x2.x3.0/k1.k2.k3.0. For example, 130.15.0.0 is an abbreviated representation of 130.15.0.0/255.255.0.0. Of course, other formats may exist and may be utilized herein provided the different formats are standardized to a singular format to aid in clustering clients in the network.

In the present invention, the network prefix/netmask entries are unified into a single standardized format as previously discussed herein and shown as step 210 in FIG. 4. Any one of the formats as discussed above or other network prefix/netmask formats that may exist will preferably be converted into this single standardized format. In one exemplary embodiment, the format x1.x2.x3.x4/k1.k2.k3.k4 is chosen as the standardized format. For instance, any network prefix/netmask entries in the format of x1.x2.x3.x4/1 and/or the format x1.x2.x3.0 will be converted into the format x1.x2.x3.x4/k1.k2.k3.k4 such that prefix/netmask entries 128.148.0.0/16, 130.15.0.0 and 192.75.72.0 will be converted respectively into 128.148/255.255, 130.15/255.255 and 192.75.72/255.255.255. These converted prefix/netmask entries are then tabulated into a single unified table with prefix/netmask entries existing in all the same format. This table may be in a simple tabular form with the multiple prefix/netmask entries listed in a grid array form.

Referring now to FIG. 6, an exemplary method for clustering clients using the unified prefix/netmask table is shown. A number of client IP addresses are first extracted from a network server log, step 600. The server log may be any generally available server log, such as a World Wide Web server log which collects client request information to the Web server. The extracted client IP addresses are matched with the entries in the unified prefix/netmask table to determine a common network address prefix, step 610. Such matching may be performed by conducting a longest prefix matching on each client IP address with each of the entries in the unified prefix/netmask table. Once prefix matching has been performed, the client IP addresses are clustered into respective client clusters, step 620. In each respective client cluster, each of the clients within a client cluster will share a common prefix, or more specifically, a common longest prefix matching from the unified prefix/netmask table. A threshold for prefix matching may be set such that a client IP address has to have at least a certain number of matching digits in the client IP address prefix with any one of the prefix/netmask entries in the unified prefix/netmask table before a match is declared. For example, in one embodiment, a client IP address may have to prefix match at least four digits of any one of the prefix/netmask entries in the unified prefix/netmask table to be considered a match.

Once clients have been clustered together in client clusters as discussed above, servers, such as proxy servers, cache servers, content distribution servers and/or mirror servers may be placed or assigned to these client clusters. Preferably, in the case of proxy servers, the proxy servers being assigned to these client clusters will be functioning as cache servers and thereby their optimum assignment or placement will depend greatly on the proper clustering of these clients. In the present invention, the servers may be assigned to these client clusters based on one or more factors or metrics such as the number of clients, the number of requests issued, the URLs accessed, the number of bytes fetched from a server and other related factors. In one embodiment, more than one server, such as a proxy server, cache server, content distribution server and/or mirror server may be assigned to the same client cluster or clusters such that the servers will together form a server cluster, as discussed earlier herein. The servers within a server cluster will act in concert with one another to service their respective client cluster(s).

In one example, proxy servers, cache servers, content distribution servers and/or mirror servers may be assigned to a client cluster based simply on the number of clients in the respective client cluster. For example, a client number threshold may be set such that a server may be assigned for every instance of the client number threshold reached. A threshold may be set at any number such as 100, 500 or a 11000 clients. In an exemplary embodiment, where the client number threshold is set at 500, a client cluster containing 4000 clients will require and be assigned at least eight (8) servers, whether they may be proxy servers, cache servers, content distribution servers and/or mirror servers. These eight servers together will form a server cluster which will be placed in front of the client cluster in the network to service the clients requests to and from the Internet.

In another example, proxy servers, cache servers and/or content distribution servers may be assigned to one or more client clusters based on the number of requests, such as HTTP request, which are issued by the clients within each respective client cluster. For example, a request threshold may be set such that a server may be assigned for client clusters which issue a certain number of requests which equals or exceeds the threshold. A threshold may be set at any number depending on the anticipated capacity of the server to be assigned to the client cluster.

In another exemplary embodiment, at least one server, such as a proxy server, cache server, content distribution server and/or mirror server, may be placed in front of each client cluster. The servers may be further grouped into server clusters based on their respective Autonomous System (AS) numbers and respective geographical locations. In this example, all servers belonging to the same AS and located geographically nearby will be grouped together to form a server cluster. In addition, in some instances, undesirable network spiders and conflicting proxy servers are eliminated from a client cluster before placing a server, such as a proxy server, cache server, content distribution server and/or mirror server to server that client cluster.

Referring to FIG. 7, an embodiment for clustering, or more specifically, for on-line network aware clustering is shown. In this embodiment, a plurality of client IP addresses are extracted, step 700. Longest prefix matching is then performed on each client IP address according to a data structure or radix-encoded trie, step 710. Once long prefix matching is performed on each client IP address, all the client IP address that have the same longest matched prefix are classified or grouped into one client cluster, step 720. In this embodiment, to cluster a set of IP addresses in an on-line network aware manner, a recursively structured table or data structure, call a radix-encoded trie or retrie is used.

As used herein, the radix-encoded trie or retrie is a basically a table indexed on some high-order bits of a given key. Each entry points to another table, indexed by some of the following bits, and so on. For background purposes, an IP address is, e.g., in IPv4, a 32-bit integer, and an IP prefix, p, is an IP address associated with a length, $l(p)\epsilon[0,32]$. Prefix p matches address A if $A \& ((2^{l(P)}-1)<<(32-l(p)))=P$, where & is bit-wise AND and << is left shift. Thus, given a collection of K-bit keys, consider a top-level retrie, R, indexed on the k most significant bits of a key. R is a table of size $2^k$. Let >> indicate right shift. Given key x, element R[x>>(K−k)] points to a second-level retrie, R', indexed on, say, the next l bits. The element of R' corresponding to x is $R'[(x>>(K-(k+i))) \& (2^t-1)]$; and so on. That is, each retrie has a shift value (K−k in the top level, K−(k+l) in the second level in this example) and a mask value ($2^k-1$ in the top level, $2^t-1$ in the second level); the top-level mask is superfluous. The shift and corresponding mask values among the lower-level retries need not be identical.

As used herein, the retrie may be completely described by a structure containing pointers to the top-level table and shift and mask values. Standard memory alignment of pointers may be used to search for key x in retrie r as follows.

```
while(!((r=r→tablel(x>>r→shift)&r→mask])&1))
```

When the loop exits, the upper 31 bits of r point to the data record for x. To build a retrie for a set S of IP prefixes, a binary search tree T describing the induced address ranges is first built. Consider prefix p=b1 . . . b32, where the b~s are the bits of p in msb-to-lsb order, and define the addresses low(p)= $b_1 \ldots b_{l(p)}0 \ldots 0$ and high(p)=$b_{l(p)} \ldots 1 \ldots 1$ where 0 . . . 0 corresponds to 32−l(p) and 1 . . . 1 corresponds to 32−l(p). Prefix P covers addresses in the range [low(p), high(p)].

Initially, T contains one key, 0, describing the range $[0, 2^{32}-1]$. We insert each prefix p in S, in non-decreasing order by length, into T as follows. Find the predecessor, x, of p in T. By induction, the properties of prefixes and the ordering of prefixes by length imply that the range of p is contained in the range [x, y), associated by invariant with x, where y is the successor of x in T. Insert low(p) and high(p)+1 into T, associating range [low(p), high(p)] with low(p). The remainder of the original range, [x,y), associated with x is split into ranges [x, low(p)), associated with x, and [high(p)+1, y), associated with high(p)+1. After construction, an LPM query on an address x could be performed by a predecessor query of x in T.

Consider a retrie to be built on some range R=[x, y) (initially [0, ∞)) of addresses, and assume a global threshold parameter t. The elements of T within R correspond to the matching prefixes within R. The shift value s and mask value m are in one-to-one correspondence. Let L be the length of the longest prefix within R. Ideally, s is set so that 32−s=L, i.e., so that the retrie fully qualifies each prefix within R. If the corresponding m exceeds $2^t-1$, however—if the table would be too big—then m is set to $2^t-1$ and s is set accordingly, resulting in lower level retries. The table is then populated using the elements of T to map IP addresses to corresponding LPMs, recursively constructing lower level retries as necessary. Another global parameter k determines that the top-level mask is always $2^k-1$.

Figure 8:
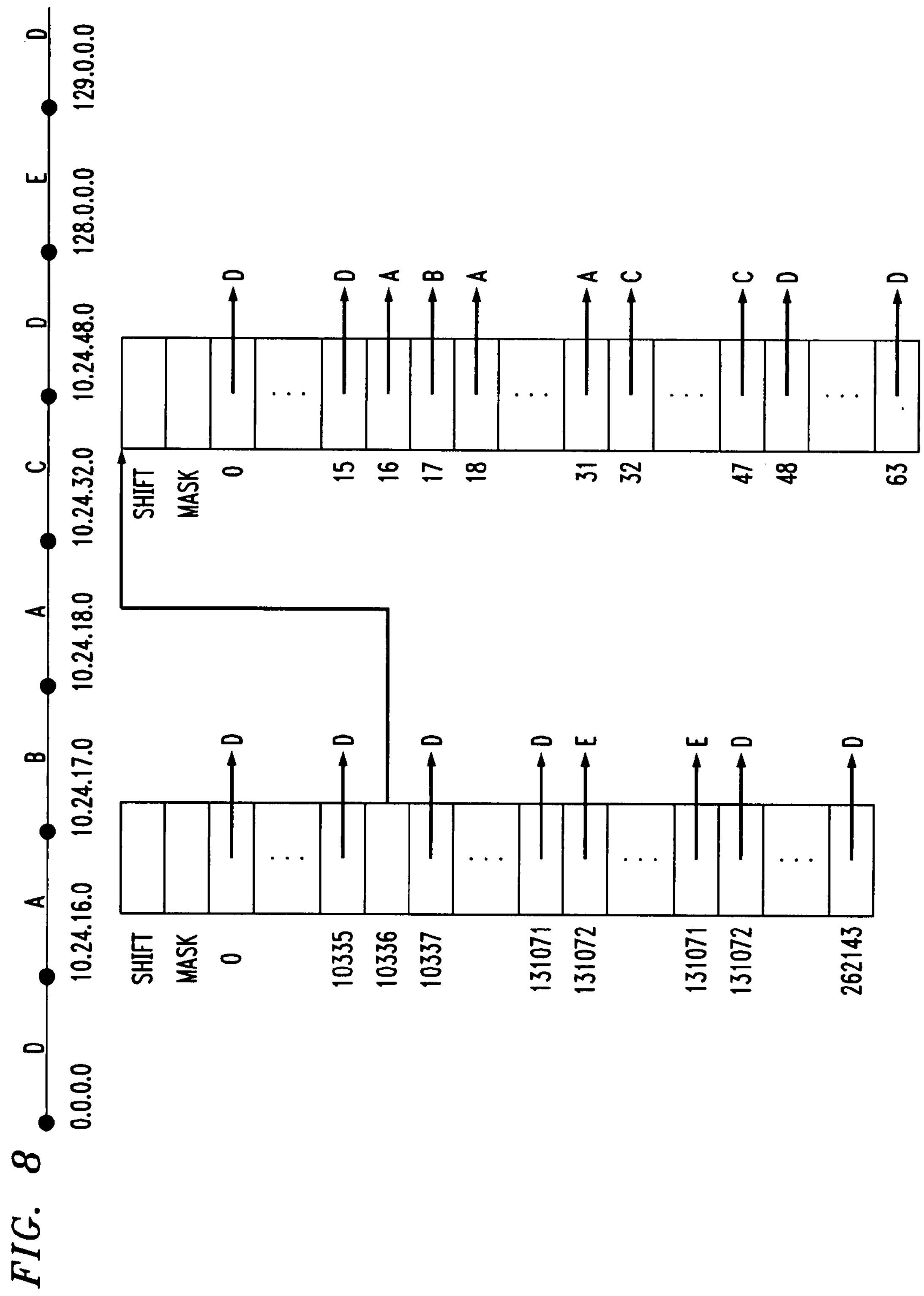
FIG. 8 illustrates an exemplary radix encoded trie structure in accordance with the teachings of the present invention.

Referring to FIG. 8, given prefixes 10.24.16.0/20 (A), 10.24.17.0/24 (B), 10.24.32.0/20 (C), 128.0.0.0/4 (E), and 0.0.0.0/0 (D). The top portion of FIG. 8 shows partition of 32-bit address space induced by the prefixes. For example, B is an extension of A, which partitions A's range, [10.24.16.0, 10.24.31.255], into subranges [10.24.16.0,10.24.16.255], [10.24.17.0,10.24.17.255], and [10.24.18.0, 10.24.31.255], associated with A, B, and C, rsp. The bottom portion of FIG. 8 shows the radix-encoded trie of the present invention. First level has 18-bit mask, and second has 6-bit mask to qualify prefixes A, B, and C fully. Masks and table indices are in decimal. For example, to search for x 10.24.19.45, we index (x>>14) & 262143=10336 in the top-level retrie, leading to the second level, which we index by (x>>8) & 63=19, yielding LPM A.

Referring again to FIG. 8, the <shift,mask>values are combined into a single value in the predecessor table which cuts the number of memory accesses in half. An exemplary code implementation of the retrie is further provided in FIG. 9*a*. In this embodiment, the elements in the last retrie table level contain only the next hop index which decreases the retrie table size, as demonstrated by the code, lpmatch( ), for (X1)+(X2). Referring now to FIG. 9*b*, an embodiment is shown where the number of retrie levels is fixed, e.g. FIG. 9*b* provides exemplary code, pmatch2( ), for a 2 level retrie.

In the present invention, clustering may be performed in both software and hardware implementations which implements the teachings and methods outlined herein. For example, the longest prefix matching process using the radix encoded trie may be implemented within either software or hardware implementations for IP routers to perform network aware clustering. For example, longest prefix matching using the radix encoded trie may be used to assist a router in determining the next network point to which a packet should be forwarded toward its destination. The router may create or maintain a table of the available routes and their conditions and use this information along with distance and cost algorithms, as well as clustering information to determine the best route for a given packet. It will be apparent to those skilled in the art that many changes and substitutions can be made to the system and method described herein without departing from the spirit and scope of the invention as defined by the appended claims.

We claim:

1. An apparatus for on-line classification of IP addresses into related clusters within a distributed information network comprising:

a memory;

means for generating a unified prefix/netmask table from a plurality of network routing table prefix/netmask entries, said unified prefix/netmask entries comprising a plurality of IP addresses;

means for processing the plurality of IP addresses according to a radix encoded trie classification process to determine a common prefix between at least a portion of the plurality of IP addresses; and means for grouping IP addresses which share a common prefix into a network client cluster.

2. The apparatus of claim 1 further comprising means for receiving the plurality of IP addresses from one or more network routers.

3. The apparatus of claim 1, wherein the IP addresses are network client IP addresses.

4. The apparatus of claim 1, wherein the distributed information network is the World Wide Web.

5. An apparatus for on-line grouping of a plurality of Web client IP addresses into related client clusters comprising:

a memory;

means for generating a unified prefix/netmask table from a plurality of network routing table prefix/netmask entries, each prefix/netmask entry in said plurality of network routing table prefix/netmask entries comprising a client IP address;

means for performing longest prefix matching on each client IP address; and means for classifying all of the client IP addresses that have the same longest matched prefix into a client cluster based on a radix encoded trie matching process.

6. The apparatus of claim 5 further comprising means for extracting the client IP addresses in real time from a network server.

7. The apparatus of claim 5, wherein the distributed information network is the Internet.

8. An apparatus for determining the relationships between a plurality of IP addresses in a unified prefix/netmask table comprising:

a memory;

means for generating a unified prefix/netmask table from a plurality of network routing table prefix/netmask entries, each prefix/netmask entry in said plurality of network routing table prefix/netmask entries comprising a client IP address;

means for processing the plurality of IP addresses according to a radix encoding trie (retrie) process to determine a common prefix between at least a portion of the plurality of IP addresses; and means for grouping all of the IP addresses which share a common longest prefix matching into at least one IP grouping.

9. The apparatus of claim 8 further comprising:

means for receiving the plurality of IP addresses from one or more network servers.

10. The apparatus of claim 9, wherein the network servers are at least one of proxy servers, cache servers, content distribution servers and mirror servers.

11. The apparatus of claim 8, wherein at least one address in said plurality of IP addresses is a client IP address.

12. The apparatus of claim 8, wherein at least one address in said plurality of IP addresses is a server IP address.

13. The apparatus of claim 8 further comprising means for combining values of the retrie into a single value in a predecessor table, wherein the retrie values include shift, mask values.

14. The apparatus of claim 8 further comprising means for decreasing the retrie table size by allowing the elements in a last retrie table level to contain only a next hop index.

15. The apparatus of claim 8 further comprising means for fixing the number of retrie levels.

16. The apparatus of claim 8 further comprising means for fixing the number of retrie levels at two levels.

17. An apparatus for classification of IP addresses into client clusters:

a memory;

means for generating a unified prefix/netmask table from a plurality of network routing table prefix/netmask entries, each prefix/netmask entry in said plurality of network routing table prefix/netmask entries comprising at least one IP address;

means for performing longest prefix matching using a radix encoded trie matching process on at least one IP address; and means for classifying said at least one IP addresses that have the same longest matched prefix into a client cluster.

18. The apparatus of claim 17, wherein the at least one IP address is a client IP address.

19. The apparatus of claim 17, wherein the at least one IP address is a server IP address, wherein the cluster is a server cluster.

20. The apparatus of claim 17 further comprising means for describing the radix encoded trie by the equation:

$$\text{while}(!((r = r \rightarrow \text{table}[(x >> r \rightarrow \text{shift}) \& r \rightarrow \text{mask}]) \& 1))$$

where x is the search key and r is the radix encode trie.

* * * * *